Oct. 12, 1954     E. H. MADISON     2,691,386
FLUID LEVEL SAFETY CONTROL VALVE
Filed April 6, 1951
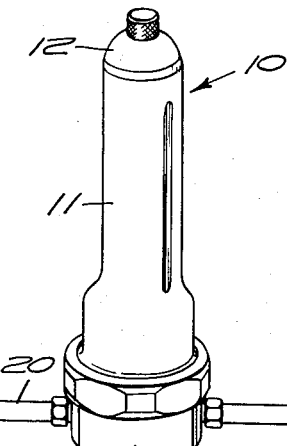
FIG. I
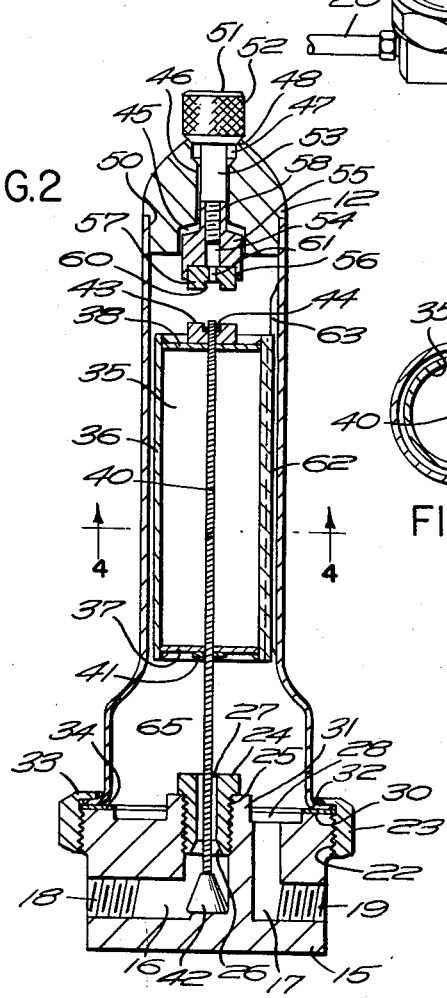
FIG. 2
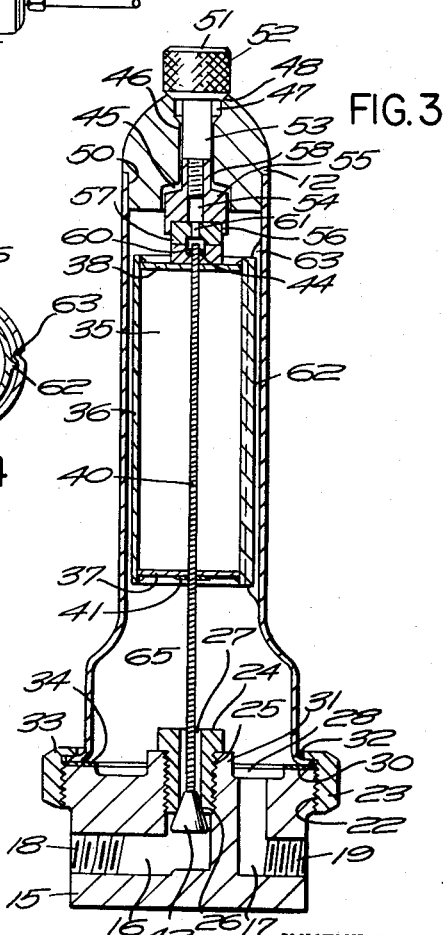
FIG. 3
FIG. 4
INVENTOR.
EARLE H. MADISON
BY
William Frederick Werner
ATTORNEY Patented Oct. 12, 1954

2,691,386

UNITED STATES PATENT OFFICE 2,691,386

FLUID LEVEL SAFETY CONTROL VALVE

Earle H. Madison, Edgewood, R. I., assignor of one-half to June L. Madison, Edgewood, R. I.

Application April 6, 1951, Serial No. 219,630

10 Claims. (Cl. 137—400)

This invention relates to improvements in fuel feed systems and more particularly to a safety control valve which will stop the flow of liquid fuel when the fluid level in the valve exceeds a predetermined point.

A principal object of the present invention is to provide a tamper proof fluid level safety control valve.

Another object of the present invention is to provide a novel float control means for a fluid level safety control valve.

Still another object of the present invention is to provide magnetically actuated parts responsive to the float movement which regulates the control valve in a fluid level safety control valve.

And still another object of the present invention is to provide a tamper proof, meddle proof, simple in operation, inexpensive in construction, positive acting fluid level safety control valve.

In the past fluid level safety control valves were not tamper proof. Users could insert a wedge, matches frequently were used, to overcome the function of the valve or so tamper with the valve to make it inoperative. The inoperative valve frequently resulted in fire and explosion in the distillate burner system. The system in which the present invention has particular novelty, although ranger burners in general require a safety control valve for safe operation.

Like reference numerals refer to like parts, in the accompanying drawings:

Figure 1 is a perspective view of the new and improved, tamper proof, fluid level safety control valve.

Figure 2 is a vertical sectional view showing the valve in open position.

Figure 3 is a vertical sectional view, similar to Figure 2, showing the valve in seated or closed position.

Figure 4 is a horizontal sectional view, taken along line 4—4 of Figure 2, showing the stop abutments.

The fluid level safety control valve 10, consists of a housing which it is contemplated may be drawn from one sheet of stock, or cast but which is herewith shown as embracing a body portion 11 and a cap portion 12 sweated, welded or otherwise united to substantially form one piece.

The base portion 15, preferably consists of a brass fitting provided with an inlet port 16, and an outlet port 17. Each of said ports is provided with a threaded portion 18 and 19, respectively, adapted to receive pipe connections 20 and 21, see Figure 1.

A threaded collar 22 on base portion 15, is adapted to receive union 23. A T fitting 24, adapted to be threaded in port 16 at 25 is provided with a poppet seat 26 in the lower portion of passageway 27. A recessed area 28 formed in the top of base portion 15, provides a well adapted to communicate with outlet port 17. In addition to creating a well, recessed area 28 provides a washer seat 30 and a collar 31 adapted to cooperate with the cross bar of T fitting 24.

The lower end of body portion 11 is flared below chamber 65 formed in the body 11, to provide a surface 32 adapted to cooperate with the lip 33 on union 23. A washer 34 is placed between surface 32 and washer seat 30 to enable union 23 through lip 33 to provide a fluid tight seal.

A float 35 consisting, by way of example, of a tubular body 36, having disks 37 and 38 secured in opposite ends is secured to threaded rod 40 by means of threads provided in disks 37 and 38. A threaded lock washer 41 aids in positioning float 35 on any desired portion of threaded rod 40. A poppet valve 42 is fastened to the end of rod 40 in any well known manner, such as swedging over the end of rod 40 after poppet valve 42 is threaded into position.

A magnet 43 is threaded to the top end of rod 40. Said magnet 43 acts as a lock washer for float 35. A lock washer 44 aids in keeping magnet 43 in any desired position on rod 40.

Cap portion 12 is provided with a passageway centrally located, consisting of a counterbored area 45 in the lower end; a main core 46 terminating in a well area 47 having a beveled seat 48 in the upper end. A recessed collar 50 in the lower section of the outside diameter is adapted to cooperate with the upper end of body portion 11 when the cap 12 and body 11 are made of separate pieces.

A shoulder screw 51 having a knurled finger grip 52 is provided with a shank 53 terminating in a threaded portion 54. A bushing 55 provided with a recessed area 56 adapted to hold a magnet 57 has a shoulder portion 58 threaded to accommodate threaded portion 54. Said bushing 55 and said shoulder screw 51 function in said passageway of cap portion 12.

Magnet 57 is provided with a slot 60 and a clearance hole 61 is provided to receive rod 40 when the adjustments of the various ports cause rod 40 to project beyond slot 60.

Referring to Figure 4, float 35 is provided with a projection 62 which extends beyond the outside diameter of tube 36. Similarly, body portion 11 is provided with a projection 63 which extends inward from the inside diameter of said body portion 11.

In operation liquid fuel flowing through pipe 20 from a storage tank (not shown) will pass through port 16 (Figure 2) past poppet valve 42 and through passageway 27 into chamber 65. It will then flow into well 28 and down through outlet port 17 and pipe 21 to the burner. This would be normal, safe procedure.

Should a surge of fuel occur due to pressure in the storage tank or from back pressure created in the use of the burner; then the fuel in chamber 65 will increase and buoy float 35. If the surge or back pressure is slight, the floatation of float 35 will cause poppet valve 42 to partially block port 16 and slightly reduce the flow of fluid from the storage tank. Should the surge or back pressure be great or in an amount which would increase the amount of fluid in chamber 65 sufficient to buoy float 35 the distance between the magnetic fields in magnets 44 and 60, then the magnets will snap together and hold poppet valve 42 in poppet valve seat 26 and block the passage of fluid through port 16. When this occurs the burner may consume the fluid in chamber 65 but beyond that supply the fire in the burner must go out for lack of fuel. See Figure 3.

The very simple expedient of twisting knurled handle 52 will cause magnets 44 and 60 to separate, due to the reversing of the polarity of the poles, thereby causing float 35 and its associated ports to take the position shown in Figure 2, wherein the fluid is free to flow normally again.

In order to provide for the separation of magnets 44 and 60 in the twisting motion, projection 62 on float 35 and projection 63 in body portion 11 will collide to allow the twist to overcome the magnetic attraction. However, should the twisting motion be instituted before the fluid level in chamber 65 is sufficiently reduced to allow magnets 44 and 60 to be beyond their magnetic attraction distance, the magnets will again unite and poppet valve 42 will remain seated as shown in Figure 3.

Rod 40 is threaded to allow the relationship between magnets 44 and 60 to be adjusted to any desired degree consistent with the functioning of float 35.

Magnets 44 and 60 are slated to increase the magnetic flux of the magnetic polarity. It is elementary knowledge in physics that the intensity of the magnetic field is increased by the distance the magnetic poles are separated from each other.

It will be seen that no amount of toying with handle 52 can unseat poppet valve 42 from its seat. Should something be placed on seat 48 it will merely slightly increase the distance float 35 will have to travel to cause magnets 44 and 60 to function. No amount of tampering can render the valve functionless unless the valve is destroyed. The increased amount of fluid in chamber 65 needed to overcome the clearance between the shoulder in bushing 55 and the base of counterbored area 45 is negligible. In addition clearance is provided in the passageway of cap 12 and the parts functioning therein, namely shoulder screw 51 and bushing 55 so that any gas accumulating in chamber 65, may escape.

Having described the invention in its preferred embodiment by way of illustration, I wish it understood that variations and changes in the individual parts could be made without departing from the spirit or scope of the advancement made in the art to which this invention pertains.

What I claim is:

1. A fluid level safety control valve comprising a body portion, a base portion, means for securing said body portion to said base portion, an inlet and outlet port in said base portion, a float provided with a magnet having means to block said inlet port, a cap portion in said body portion having a passageway adapted to accommodate a shoulder screw secured to a bushing housing a magnet and means to change the polarity of said magnets in relation to each other.

2. A fluid level safety control valve comprising a body portion and a base having inlet and outlet ports forming a fluid chamber, a float within the chamber, an annular magnetic metal element carried by the float, means carried by the float at the bottom thereof and engageable in the base to shut off the flow of fluid into the chamber, control means comprising an annular magnetic metal element attached to and rotatable in the top of the body portion cooperating with a projection on the float and a projection in the body portion.

3. A fluid level safety control valve comprising a body portion and a base having inlet and outlet ports forming a fluid chamber, a float within the chamber, an annular bifurcated magnetic element attached to the float, an annular bifurcated magnetic element attached to and rotatable in the top of the body portion cooperating with a projection on the float and a projection in the body portion to change the polarity of said magnetic elements in relation to each other, said magnetic elements having smaller external diameters than the float and assuming at all times a substantially horizontal position and said magnetic elements operating to engage or disengage in accordance with changes of the fluid level in said chamber.

4. A fluid level safety control valve comprising a body portion, a cap portion and a base having inlet and outlet ports united to the body portion to form a fluid level chamber, a float within the chamber carrying a magnetic element and a rod attached to a poppet valve actuating within the intake port, a movable control element outside the chamber, a magnetic element forming part of the control element, means maintaining the float against turning said magnetic elements and said control element responsive to changes in the fluid level in the chamber.

5. A fluid level safety control valve comprising a body portion, a cap portion and a base having inlet and outlet ports secured to the body portion to form a fluid level chamber, a float within the chamber carrying a magnetic element positioned entirely above the liquid level in the chamber, a rod attached to the float and magnetic element having a poppet valve fixed to its lower end, said poppet valve being located within said intake port, a movable control element having a control knob outside said chamber with a magnetic element inside said chamber cooperating with said magnetic element on said float in response to changes of the fluid level within said chamber and means maintaining the float and one magnetic element against complete circular rotation.

6. A fluid level safety control valve comprising a body portion provided with a flared lower end, a cap portion united to said body portion provided with a passageway adapted to accommodate a bushing housing a magnet secured to a shoulder screw, a base having an inlet port and an outlet port provided with a T fitting in said inlet port said T fitting having a poppet valve seat in the lower portion of its passageway, a well provided in the top surface of said base communicating with said outlet port, said well forming a seat for said T fitting and a washer seat, a washer interposed between said flared lower end of said body portion, a threaded collar in the upper portion of said base, a union adapted to cooperate with said threaded collar and said flared lower end of said body portion, a float united to a threaded rod having a poppet valve secured to its lower end, a magnet secured to its upper end and collars threaded immediately below said float and above said magnet to allow said poppet valve to engage said poppet valve seat when said magnets engage.

7. A fluid level safety control valve comprising a non-magnetic body portion having a flared edge formed in the expanded chamber area, a non-magnetic base having an inlet port, a recessed annular ring well communicating with an outlet port, a threaded annular external collar formed in the upper surface of the base, a washer seat formed on the upper outside surface of said base by said recessed annular ring well, a threaded centrally located projection formed in said intake port, a non-magnetic T fitting having a shoulder communicating with said projection and threaded to accommodate said threaded intake port, the passageway in said T fitting provided with a poppet valve seat, a union uniting said flared end and said base with a washer interposed between said edge and said washer seat, a non-magnetic float comprising a tubular body having a projection on one side, non-magnetic disks fixed in opposite ends of said tubular body, a non-magnetic threaded rod fastened in said disks having a poppet valve fixed to its lower end in position to cooperate with said poppet valve seat, a non-magnetic lock washer fixed on said rod resting against the lower disk, a magnet fixed to the upper end of said rod, a lock washer fixed to said rod resting against said magnet, a projection in said body portion adapted to cooperate with said projection in said tubular body, a non-magnetic cap fixed in the upper narrow end of said body portion having a passageway flared at the upper edge, a well portion below said flared upper edge, a counterbored area in the lower end of said passageway, a non-magnetic shoulder stud having a knurled outer surface attached to a shank threaded into a non-magnetic bushing housed in said counterbored area and a magnet fixed in said bushing adapted to cooperate with said magnet fixed to said rod.

8. A fluid level safety control valve comprising a body portion, a base portion, means for uniting said body portion to said base portion, an inlet and outlet port in said base portion, a float provided with a magnet having means to block one of said ports, a second magnet in juxtaposition to the magnet carried by said float, rotatable mounting means for said second magnet so arranged whereby when said second magnet is in one position it retains the float and port blocking means in a fluid sealing position and when turned in a second position said float and blocking means will permit fluid passage.

9. In combination a movable element, a magnetizable member associated with said movable element, a permanent magnet, associated with a float having port blocking means, operative to attract said magnetizable member and retain said member in association, mounting means supporting said permanent magnet capable of manual movement for positioning said magnet in a repelling position to release said magnetizable member.

10. In combination, a support, manually operable means rotatably mounted in said support, a magnet carried by said manually operable means and turnable thereby from attracting position to a repelling position, a gravity influenced element operatively arranged to approach and recede from confronting relationship of said magnet, said element carrying a magnet in opposed relation to the magnet on said manually operable means whereby when the latter is turned in one position the magnetic field of the latter will grip said magnet on said element and when the manually operable means is turned into a second position the magnetic field of said first mentioned magnet, will repel that of the magnet carried by said element which will be free to recede by gravity into a disengaged position.

References Cited in the file of this patent

UNITED STATES PATENTS

| Number | Name | Date |
|---|---|---|
| 1,611,398 | Wiggins | Dec. 21, 1926 |
| 1,745,762 | Honiss | Feb. 4, 1930 |
| 1,803,879 | Tapp | May 5, 1931 |
| 2,208,181 | Eggleston | July 16, 1940 |
| 2,226,287 | Miller | Dec. 24, 1940 |
| 2,231,158 | Davis | Feb. 11, 1941 |
| 2,353,740 | Malone | July 18, 1944 |
| 2,371,511 | Faus | Mar. 13, 1945 |
| 2,387,858 | Russel | Oct. 30, 1945 |
| 2,494,395 | Landon | Jan. 10, 1950 |
| 2,557,634 | Cox | June 19, 1951 |

FOREIGN PATENTS

| Number | Country | Date |
|---|---|---|
| 589,617 | Germany | 1933 |